(12) United States Patent
Kurashige et al.

(10) Patent No.: US 12,265,148 B2
(45) Date of Patent: Apr. 1, 2025

(54) RADAR DEVICE

(71) Applicant: Mitsubishi Electric Corporation, Tokyo (JP)

(72) Inventors: Kazunori Kurashige, Tokyo (JP); Tatsuya Kamimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 425 days.

(21) Appl. No.: 17/423,900

(22) PCT Filed: Mar. 25, 2019

(86) PCT No.: PCT/JP2019/012574
§ 371 (c)(1),
(2) Date: Jul. 19, 2021

(87) PCT Pub. No.: WO2020/194462
PCT Pub. Date: Oct. 1, 2020

(65) Prior Publication Data
US 2022/0082677 A1 Mar. 17, 2022

(51) Int. Cl.
*G01S 13/34* (2006.01)
*G01S 7/35* (2006.01)
*G01S 7/40* (2006.01)

(52) U.S. Cl.
CPC ............ *G01S 13/345* (2013.01); *G01S 7/352* (2013.01); *G01S 7/4008* (2013.01)

(58) Field of Classification Search
CPC ...... G01S 13/345; G01S 7/352; G01S 7/4008; G01S 13/34
See application file for complete search history.

(56) References Cited

U.S. PATENT DOCUMENTS 4,079,377 A * 3/1978 zur Heiden ........... G01S 13/345
342/128
5,483,242 A * 1/1996 Grein .................... G01S 13/345
342/111
(Continued)

FOREIGN PATENT DOCUMENTS

JP 2008232854 A * 10/2008
JP 2018-179798 A 11/2018
(Continued)

OTHER PUBLICATIONS

U.S. Appl. No. 17/423,900_Feb. 14, 2024_WO_2017199296_A1_M.pdf, machine translation of WO-2017199296-A1 (Year: 2017).*
(Continued)

*Primary Examiner* — Timothy A Brainard
*Assistant Examiner* — Kenneth W Good
(74) *Attorney, Agent, or Firm* — XSENSUS LLP (57) ABSTRACT

A radar device utilizing frequency modulation of a frequency modulated continuous wave type, and includes a voltage-controlled oscillator generating a high frequency signal frequency-modulated based on a triangular wave voltage signal, a transmission antenna emitting the high frequency signal into the air, a receiving antenna receiving, as a reception signal, a reflected wave from a target object, of the high frequency signal, a mixer generating a beat signal having a frequency equal to a frequency difference between the reception signal and the high frequency signal, and a microcomputer calculating distance from the target object and relative velocity with respect to the target object, using the beat signal, and causing the initial voltage of the triangular wave voltage signal corresponding to second modulation scheme to be equal to that corresponding to first modulation scheme at a time of switching from the first modulation scheme to the second modulation scheme.

15 Claims, 9 Drawing Sheets

(56) References Cited

U.S. PATENT DOCUMENTS

| | | | | |
|---|---|---|---|---|
| 8,994,586 | B1 * | 3/2015 | Choi | G01S 7/35 |
| | | | | 342/128 |
| 10,567,063 | B1 * | 2/2020 | Bakeer | H04B 7/0682 |
| 10,830,867 | B2 * | 11/2020 | Lin | G01S 13/86 |
| 2013/0002470 | A1 * | 1/2013 | Kambe | G01S 13/931 |
| | | | | 342/55 |
| 2018/0031691 | A1 * | 2/2018 | Kurashige | G01S 13/345 |
| 2019/0120933 | A1 | 4/2019 | Kurashige | |
| 2019/0391249 | A1 * | 12/2019 | Takeuchi | G01S 13/536 |

FOREIGN PATENT DOCUMENTS

| | | | | |
|---|---|---|---|---|
| WO | WO-2017175427 | A1 * | 10/2017 | G01S 13/34 |
| WO | WO-2017199296 | A1 * | 11/2017 | G01S 13/34 |

OTHER PUBLICATIONS

U.S. Appl. No. 17/423,900_Nov. 6, 2023_WO_2017175427_A1_M.pdf, machine translation of WO-2017175427-A1 (Year: 2017).*
U.S. Appl. No. 17/423,900_Nov. 6, 2023_JP_2008232854_A_M.pdf, machine translation of JP-2008232854-A (Year: 2008).*
International Search Report and Written Opinion mailed on May 21, 2019, received for PCT Application PCT/JP2019/012574, Filed on Mar. 25, 2019, 7 pages including English Translation.
Office Action issued on Mar. 15, 2022, in corresponding Japanese patent Application No. 2021-508433, 7 pages.

* cited by examiner

| HIT<br>DIS-<br>TANCE | 1 | 2 | 3 | 4 | 5 | 6 | ... | ... | ... | 511 | 512 |
|---|---|---|---|---|---|---|---|---|---|---|---|
| 10m | *** | *** | *** | *** | *** | *** | *** | *** | *** | *** | *** |
| 30m | *** | *** | *** | *** | *** | *** | *** | *** | *** | *** | *** |
| 50m | *** | *** | *** | *** | *** | *** | *** | *** | *** | *** | *** |
| 100m | *** | *** | *** | *** | *** | *** | *** | *** | *** | *** | *** |
| 150m | *** | *** | *** | *** | *** | *** | *** | *** | *** | *** | *** |
| 200m | *** | *** | *** | *** | *** | *** | *** | *** | *** | *** | *** |

| HIT<br>DIS-<br>TANCE | 1 | 2 | 3 | 4 | 5 | 6 | ... | ... | ... | 511 | 512 |
|---|---|---|---|---|---|---|---|---|---|---|---|
| 10m | *** | *** | *** | *** | *** | *** | *** | *** | *** | *** | *** |
| 30m | *** | *** | *** | *** | *** | *** | *** | *** | *** | *** | *** |
| 50m | *** | *** | *** | *** | *** | *** | *** | *** | *** | *** | *** |
| 100m | *** | *** | *** | *** | *** | *** | *** | *** | *** | *** | *** |
| 150m | *** | *** | *** | *** | *** | *** | *** | *** | *** | *** | *** |
| 200m | *** | *** | *** | *** | *** | *** | *** | *** | *** | *** | *** |

| DIS-TANCE \ HIT | 1 | 2 | 3 | 4 | 5 | 6 | ... | ... | ... | 511 | 512 |
|---|---|---|---|---|---|---|---|---|---|---|---|
| 10m | *** | *** | *** | *** | *** | *** | *** | *** | *** | *** | *** |
| 30m | *** | *** | *** | *** | *** | *** | *** | *** | *** | *** | *** |
| 50m | *** | *** | *** | *** | *** | *** | *** | *** | *** | *** | *** |
| 100m | *** | *** | *** | *** | *** | *** | *** | *** | *** | *** | *** |
| 150m | *** | *** | *** | *** | *** | *** | *** | *** | *** | *** | *** |
| 200m | *** | *** | *** | *** | *** | *** | *** | *** | *** | *** | *** |

| DIS-TANCE \ HIT | 1 | 2 | 3 | 4 | 5 | 6 | ... | ... | ... | 511 | 512 |
|---|---|---|---|---|---|---|---|---|---|---|---|
| 10m | *** | *** | *** | *** | *** | *** | *** | *** | *** | *** | *** |
| 30m | *** | *** | *** | *** | *** | *** | *** | *** | *** | *** | *** |
| 50m | *** | *** | *** | *** | *** | *** | *** | *** | *** | *** | *** |
| 100m | *** | *** | *** | *** | *** | *** | *** | *** | *** | *** | *** |
| 150m | *** | *** | *** | *** | *** | *** | *** | *** | *** | *** | *** |
| 200m | *** | *** | *** | *** | *** | *** | *** | *** | *** | *** | *** |

RADAR DEVICE

CROSS-REFERENCE TO RELATED APPLICATION

The present application is based on PCT filing PCT/JP2019/012574, filed Mar. 25, 2019, the entire contents of which are incorporated herein by reference.

FIELD

The present invention relates to a radar device that utilizes frequency modulation of a frequency modulated continuous wave (FM-CW) type.

BACKGROUND

Conventional FM-CW radars are radar devices having an easy circuit configuration to perform signal processing using a baseband signal in a relatively low frequency band. Thus, conventional FM-CW radars are widely used as a reduced-cost, millimeter-wave band anti-collision radar or the like. In these days, an FM-CW radar that utilizes a high-speed modulation scheme is also used to meet a demand for reduction in false alarm probability of an anti-collision radar, and a demand for increase in the frequency of updating the observation result of an FM-CW radar.

A conventional FM-CW radar calculates the distance between the radar and a target object and the velocity of the target object using an up-chirp in which a transmission frequency changes from a lower frequency to a higher frequency and a down-chirp in which a transmission frequency changes from a higher frequency to a lower frequency. Specifically, the distance and the relative velocity between a target object and the radar are calculated using the sum of the peak frequencies and the difference between the peak frequencies of the beat signals respectively obtained from the up-chirp and from the down-chirp.

In addition, due to a device-to-device variation and due to temperature characteristics of the voltage-controlled oscillator (VCO), the transmission-reception module unit included in an FM-CW radar essentially needs adjustment to be performed in the pre-shipment inspection stage. Patent Literature 1 discloses a radar device that calculates frequency information from phase information on a frequency-divided signal from the voltage-controlled oscillator, and updates data stored in a look-up table with correction data generated using the calculation result. This can provide appropriate compensation for a change in characteristic of the voltage-controlled oscillator caused by a device-to-device variation and/or the like.

CITATION LIST

Patent Literature

Patent Literature 1: WO 2017/199296 A

SUMMARY

Technical Problem

However, an FM-CW radar using an open loop technology and not using a phase locked loop (PLL) in signal source control, such as the radar device described in Patent Literature 1, suffers from the fact that the phase of the beat signal is affected by a history effect of the voltage-controlled oscillator when modulation is performed in multiple different bandwidths within the same frame. This presents a problem in that an FM-CW radar using an open loop technology is subjected to a decrease in accuracy of measurement of the relative velocity of the target object.

The present invention has been made in view of the foregoing, and it is an object of the present invention to provide a radar device of an open loop type that reduces a decrease in accuracy of measurement of the relative velocity of a target object.

Solution to Problem

In order to solve the above problem and achieve the object, a radar device according to the present invention is a radar device that utilizes frequency modulation of a frequency modulated continuous wave type. The radar device includes: a voltage-controlled oscillator to generate a high frequency signal frequency-modulated based on a triangular wave voltage signal; a transmission antenna to emit the high frequency signal into air; a receiving antenna to receive, as a reception signal, a reflected wave from a target object, of the high frequency signal; a mixer to generate a beat signal having a frequency equal to a frequency difference between the reception signal and the high frequency signal; and a control unit to calculate a distance from the target object and a relative velocity with respect to the target object, using the beat signal, and to cause an initial voltage of the triangular wave voltage signal corresponding to a second modulation scheme to be equal to an initial voltage of the triangular wave voltage signal corresponding to a first modulation scheme at a time of switching from the first modulation scheme to the second modulation scheme within a same frame.

Advantageous Effects of Invention

A radar device according to the present invention provides an advantage in being capable of reducing a decrease in accuracy of measurement of the relative velocity of the target object.

DESCRIPTION OF EMBODIMENTS

A radar device according to embodiments of the present invention will be described in detail below with reference to the drawings. Note that these embodiments are not intended to limit the scope of this invention.

First Embodiment

Figure 1:
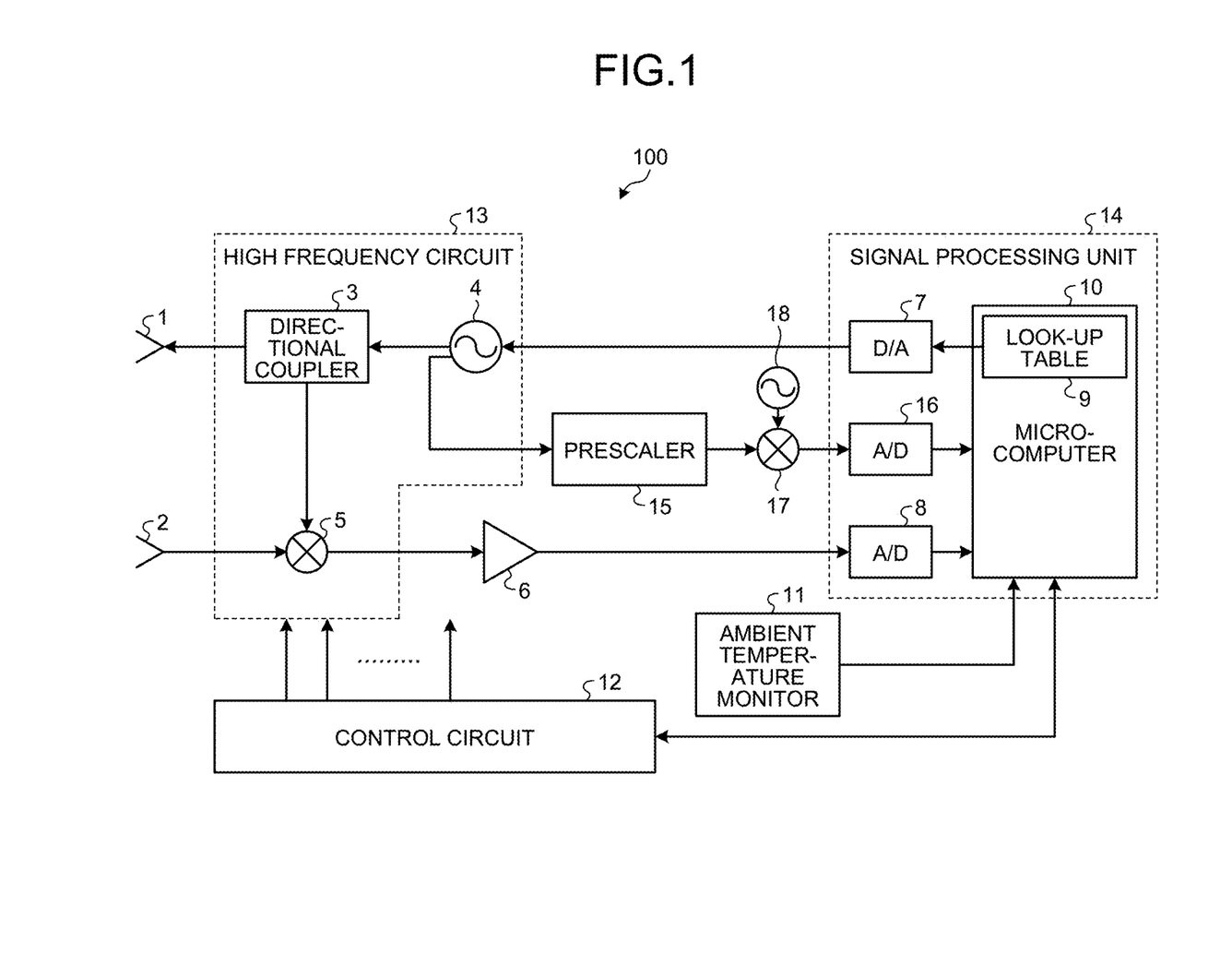
FIG. 1 is a first diagram illustrating a configuration of a radar device according to a first embodiment.

FIG. 1 is a first diagram illustrating a configuration of a radar device according to a first embodiment. A radar device 100 according to the first embodiment is an FM-CW radar that utilizes frequency modulation of an FM-CW type. The radar device 100 includes a transmission antenna 1, a receiving antenna 2, a baseband amplifier circuit 6, an ambient temperature monitor 11, a control circuit 12, a high frequency circuit 13, a signal processing unit 14, a prescaler 15, a mixer 17, and a reference frequency generator 18.

The transmission antenna 1 emits a transmission signal that is a high frequency signal into the air in the form of a radio wave. The receiving antenna 2 receives a reflected wave from a target object, of the radio wave transmitted from the transmission antenna 1. The reflected wave received is also referred to hereinafter as reception signal. The high frequency circuit 13 receives the reception signal received by the receiving antenna 2. In addition, the high frequency circuit 13 generates a beat signal using the transmission signal and the reception signal, and outputs the beat signal to the baseband amplifier circuit 6. The baseband amplifier circuit 6 amplifies the beat signal to an appropriate level, and outputs the amplified signal to the signal processing unit 14. The signal processing unit 14 calculates the distance between the radar device 100 and the target object and the relative velocity with respect to the target object, using the beat signal. The control circuit 12 controls the voltage value of the control voltage to be supplied to the high frequency circuit 13. The ambient temperature monitor 11 measures the surrounding temperature.

The high frequency circuit 13 includes a directional coupler 3, a voltage-controlled oscillator 4, and a mixer 5. The voltage-controlled oscillator 4 generate a high frequency signal frequency-modulated based on a VCO modulation voltage that is a triangular wave voltage signal output by the signal processing unit 14. The triangular wave voltage signal is also called transmission command. The directional coupler 3 outputs part of the high frequency signal to the transmission antenna 1, and outputs the rest of the high frequency signal, not output to the transmission antenna 1, to the mixer 5. The rest of the high frequency signal, not output to the transmission antenna 1, is also called local signal. The mixer 5 performs frequency conversion, specifically, down-conversion, using the reception signal and the local signal. In addition, the mixer 5 outputs the frequency-converted signal to the baseband amplifier circuit 6. The directional coupler 3, the voltage-controlled oscillator 4, and the mixer 5 are included in a monolithic microwave integrated circuit (MMIC). The baseband amplifier circuit 6 amplifies the frequency-converted output, and outputs the amplified signal to the signal processing unit 14.

The signal processing unit 14 includes a digital-to-analog converter 7, analog-to-digital converters 8 and 16, and a microcomputer 10. The microcomputer 10 is also called control unit. The microcomputer 10 primarily performs transmission processing of the transmission signal and measurement processing. In addition, the microcomputer 10 includes a look-up table 9 that stores data on the triangular wave voltage signal to be output to the voltage-controlled oscillator 4. The digital-to-analog converter 7 converts the triangular wave voltage signal, i.e., the digital signal output by the microcomputer 10, into an analog signal, and outputs the analog signal to the voltage-controlled oscillator 4. The analog-to-digital converter 8 converts the reception signal, i.e., the analog signal output thereto by the baseband amplifier circuit 6, into a digital signal, and outputs the digital signal to the microcomputer 10. The ambient temperature monitor 11 is connected to the microcomputer 10.

The control circuit 12 supplies a control voltage to the directional coupler 3, to the voltage-controlled oscillator 4, and to the mixer 5 according to control by the microcomputer 10. The microcomputer 10 includes a non-volatile memory. Note that the hardware configuration of the microcomputer 10 will be described in detail later. Each MMIC in the high frequency circuit 13 may have a different proper value of control voltage depending on the production lot and on the ambient temperature. The microcomputer 10 therefore stores, in the non-volatile memory, control voltage values dependent on the ambient temperature, determined through individual adjustment of MMICs on a product-to-product basis. In actual operation, the microcomputer 10 periodically monitors the ambient temperature using the ambient temperature monitor 11, reads a control voltage value corresponding to the ambient temperature from the non-volatile memory, and supplies a control voltage to each MMIC in the high frequency circuit 13 through the control circuit 12.

The voltage-controlled oscillator 4 generates an FM-CW signal using the triangular wave voltage signal output by the signal processing unit 14. The FM-CW signal is a high frequency signal consisting of an up-modulated signal having a frequency increasing in a certain time period and a down-modulated signal having a frequency decreasing in a certain time period. The up-modulated signal is also referred to as up-chirp. The down-modulated signal is also referred to as down-chirp. In addition, the voltage-controlled oscillator 4 outputs the FM-CW signal to the directional coupler 3. The directional coupler 3 outputs one portion of the FM-CW signal to the transmission antenna 1. In addition, the directional coupler 3 outputs another portion of the FM-CW signal to the mixer 5 as a local signal. The one portion of the FM-CW signal is greater in the amount of signal than the other portion of the FM-CW signal. The transmission antenna 1 emits the FM-CW signal toward the target object in the form of a millimeter radio wave.

The receiving antenna 2 receives, as the reception signal, the reflected wave from the target object, of the transmission signal. In addition, the receiving antenna 2 inputs the radio wave received into the mixer 5 as the reception signal. The mixer 5 mixes the reception signal input from the receiving antenna 2 and the local signal output by the directional coupler 3 to generate a beat signal having a frequency equal to the frequency difference between the reception signal and the local signal. In addition, the mixer 5 outputs the beat signal generated, to the baseband amplifier circuit 6. The baseband amplifier circuit 6 amplifies the beat signal, and outputs the amplified signal to the analog-to-digital converter 8. The analog-to-digital converter 8 converts the beat signal from an analog signal to a digital signal, and outputs the beat signal having been converted into a digital signal to the microcomputer 10. The microcomputer 10 analyzes the frequency of the beat signal, and calculates the distance to the target object and the relative velocity.

The prescaler 15 reduces the frequency of a frequency-divided signal of the triangular wave voltage signal to a certain integer fraction of that frequency, i.e., a result of division by a certain integer of that frequency, and outputs the frequency-divided signal having the reduced frequency to the mixer 17. The mixer 17 mixes the frequency-divided signal having the reduced frequency and the local signal output by the reference frequency generator 18 to generate a signal having a frequency equal to the frequency difference between the frequency-divided signal and the local signal, and outputs the resulting signal to the analog-to-digital converter 16. The analog-to-digital converter 16 converts the signal generated by the mixer 17 from an analog signal to a digital signal, and outputs the signal having been converted to the microcomputer 10. This signal generated by the mixer 17 is used in updating of data of the triangular wave voltage signal stored in the look-up table 9.

Figure 2:
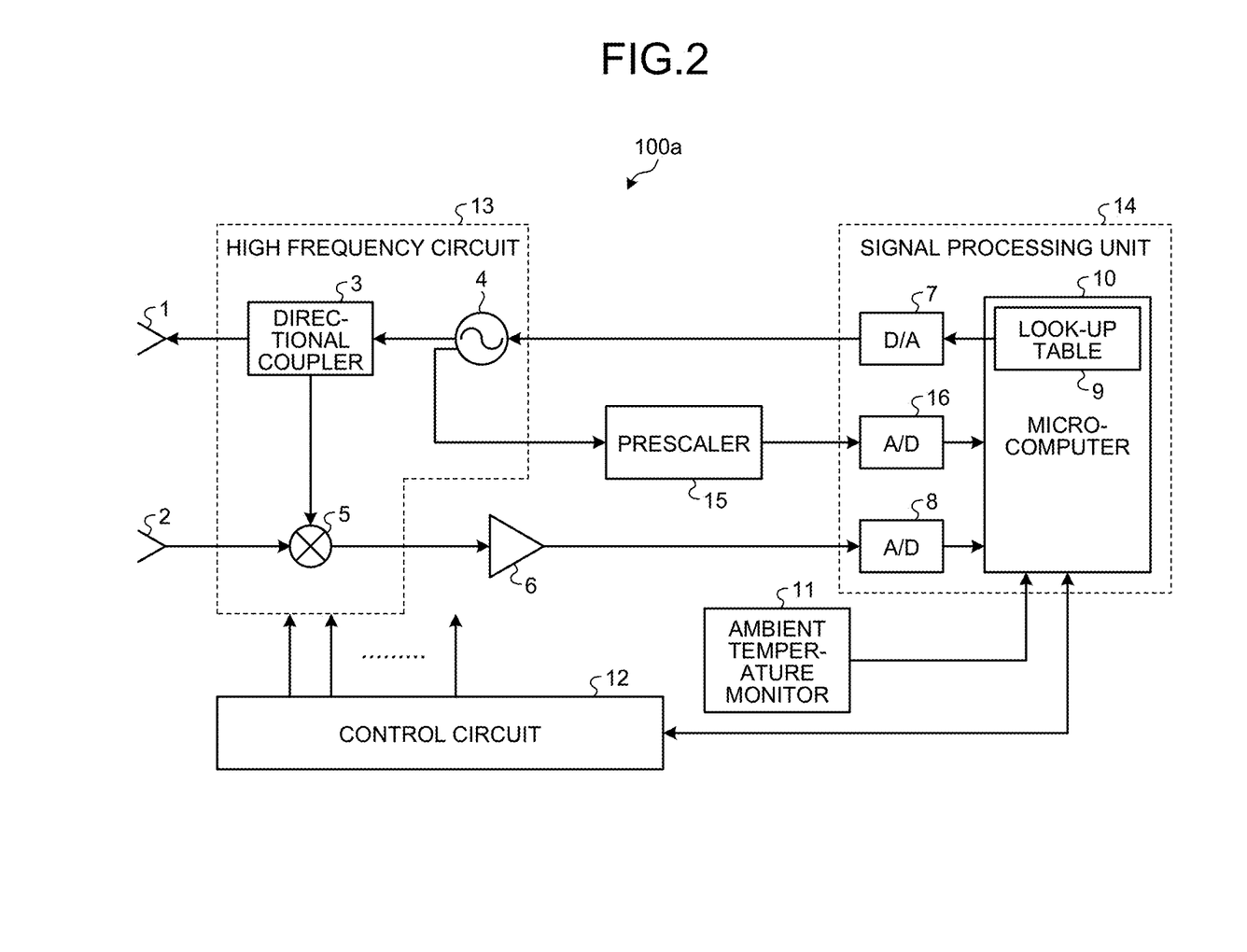
FIG. 2 is a second diagram illustrating a configuration of a radar device according to the first embodiment.

FIG. 2 is a second diagram illustrating a configuration of a radar device according to the first embodiment. A radar device 100a includes neither the mixer 17 nor the reference frequency generator 18 as compared to the radar device 100. The other functional units included in the radar device 100a are identical to the corresponding functional units included in the radar device 100.

A hardware configuration of the microcomputer 10 will next be described. The microcomputer 10 is implemented in processing circuitry that is an electronic circuit that performs each processing.

Figure 3:
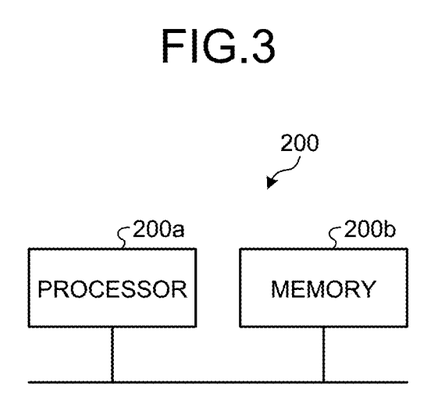
FIG. 3 is a diagram illustrating a control circuit according to the first embodiment.

The processing circuitry may be a dedicated hardware element or a control circuit including a memory and a central processing unit (CPU) that executes a program stored in the memory. In this regard, the memory may be, for example, a non-volatile or volatile semiconductor memory such as a random access memory (RAM), a read-only memory (ROM), or a flash memory; a magnetic disk, an optical disk, or the like. FIG. 3 is a diagram illustrating the control circuit according to the first embodiment. In a case in which the processing circuitry is a control circuit including a CPU, the control circuit is, for example, a control circuit 200 having the configuration illustrated in FIG. 3.

As illustrated in FIG. 3, the control circuit 200 includes a processor 200a, which is a CPU, and a memory 200b. In a case of implementation in the control circuit 200 illustrated in FIG. 3, each functionality is implemented by the processor 200a by reading and executing a program stored in the memory 200b and corresponding to each processing. The memory 200b is also used as a temporary memory in each processing performed by the processor 200a.

An operation of the microcomputer 10 will be described. The microcomputer 10 causes the initial voltage of the triangular wave voltage signal corresponding to a second modulation scheme to be equal to the initial voltage of the triangular wave voltage signal corresponding to a first modulation scheme at the time of switching from the first modulation scheme to the second modulation scheme within the same frame. In addition, the microcomputer 10 generates and updates a look-up table that causes the voltage at the start of modulation in the second modulation scheme to be equal to the voltage at the start of modulation in the first modulation scheme. As used herein, the signal modulated in the first modulation scheme is referred to as first signal. In addition, the signal modulated in the second modulation scheme is referred to as second signal. The phrase "within the same frame" refers to a set of all of the hits of the signal modulated in the first modulation scheme and all of the hits of the signal modulated in the second modulation scheme. One frame corresponds to one scanning of the radar device, and is typically configured to have a length in a range from 50 to 100 ms. In this case, the radar device repeats scanning every time period ranging from 50 to 100 ms. The transmission frequencies of the first signal and of the second signal each depend on the voltage of the triangular wave voltage signal. Thus, the microcomputer 10 causes the initial voltages of the triangular wave voltage signals to be equal to each other to generate and update the look-up table 9 that will eliminate the transmission frequency difference. The microcomputer 10 includes the look-up table 9, which stores data on the triangular wave voltage signal to be output to the voltage-controlled oscillator 4, and appropriate arrangement of values of this data can eliminate changing of the phase of the signal, and can thus reduce a decrease in accuracy of measurement of the relative velocity of the target.

Figure 4:
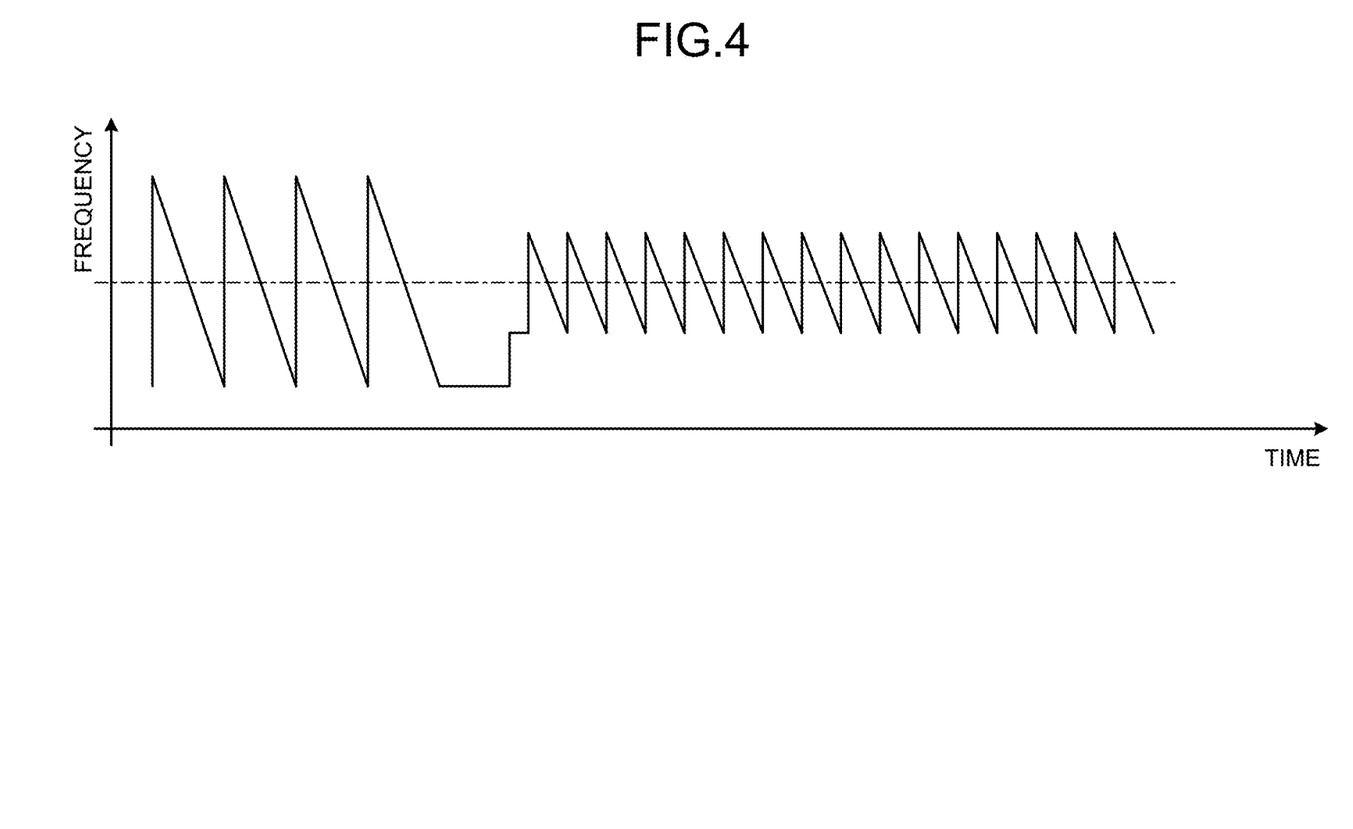
FIG. 4 is a diagram illustrating a comparative example of transmission frequency when a conventional FM-CW radar modulates two signals.

FIG. 4 is a diagram illustrating a comparative example of transmission frequency when a conventional FM-CW radar modulates two signals. FIG. 4 illustrates four hits of the first signal and twelve hits of the second signal. As used herein, the term "hit" refers to impingement of a transmitted pulse upon the target, and the term "number of hits" refers to the number of transmitted pulses that impinge upon the target in one scanning of the radar device. The first signal and the second signal are modulated using different bandwidths. The fourth hit of the first signal from the left illustrated in FIG. 4 is the last hit of the first signal. In FIG. 4, the vertical axis represents the frequency, and the horizontal axis represents the time. In addition, FIG. 4 indicates the center frequencies of the first signal and of the second signal by a dashed-and-dotted line. In performing modulation using different bandwidths for modulation, a conventional microcomputer generates a look-up table to cause the signals to have the same center frequency, and controls the voltage-controlled oscillator using this look-up table. In this case, history effect of the voltage-controlled oscillator affects the phase of the beat signal. This may prevent a conventional radar device from accurately measuring the relative velocity.

Figure 5:
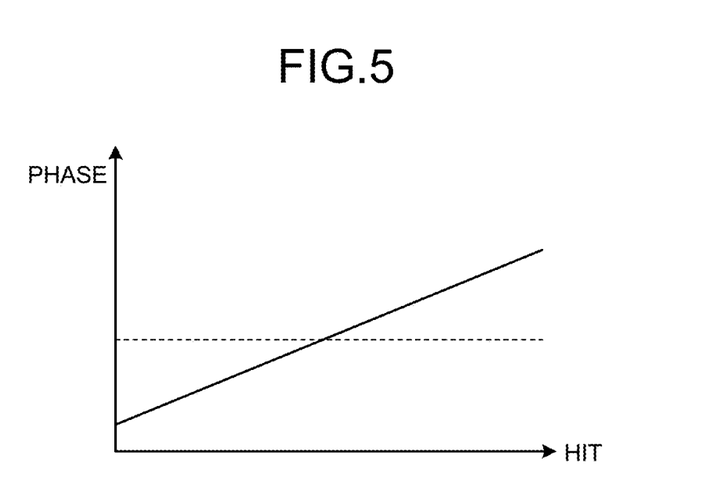
FIG. 5 is a diagram illustrating the phase of a beat signal at each hit when a stationary target object is detected using the transmission frequency of FIG. 4.

FIG. 5 is a diagram illustrating the phase of the beat signal at each hit when a stationary target object is detected using the transmission frequency of FIG. 4. In FIG. 5, the vertical axis represents the phase, and the horizontal axis represents the hit number. A hit number is the number of each hit illustrated in FIG. 4. In addition, FIG. 5 uses a broken line to represent an expected phase value, and uses a solid line to represent the actual phase value. When the relative velocity between the radar device and the target object is zero, the phase of the beat signal is expected to be constant. However, in FIG. 5, an unnecessary phase change has produced a result as if the relative velocity between the radar device and the target object were non-zero.

Figure 6:
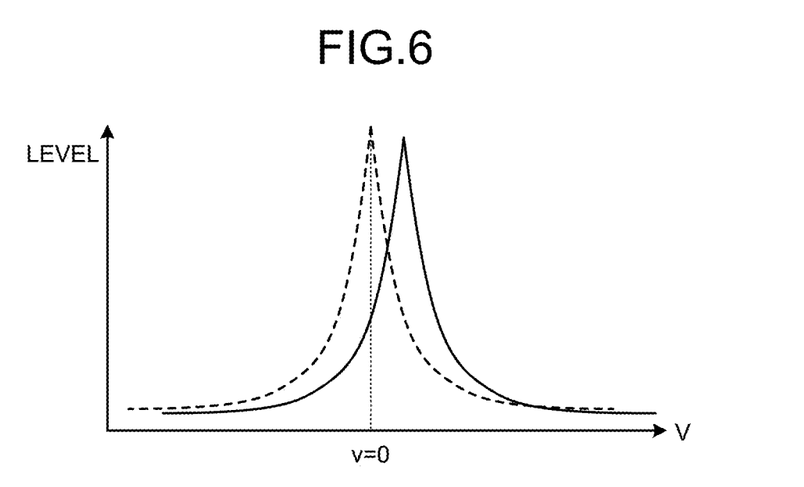
FIG. 6 is a diagram illustrating a result of performing velocity fast Fourier transform (FFT) when a stationary target object is detected using the transmission frequency of FIG. 4.

FIG. 6 is a diagram illustrating a result of performing velocity fast Fourier transform (FFT) when a stationary target object is detected using the transmission frequency of FIG. 4. Velocity FFT is an operation of calculation of the relative velocity with respect to the target object by FFT using the beat signal obtained at each hit. In FIG. 6, the vertical axis represents the level of spectrum, and the horizontal axis represents the velocity of the target object. In addition, FIG. 6 uses a broken line to represent an expected spectrum, and uses a solid line to represent the actual spectrum. When the relative velocity between the radar device and the target object is zero, the result of performing velocity FFT is expected to have a peak at V=0. However, in FIG. 6, an unnecessary phase change has produced a result of performing velocity FFT having a peak at a value greater than V=0, that is, a result as if the relative velocity between the radar device and the target object were non-zero.

Figure 7:
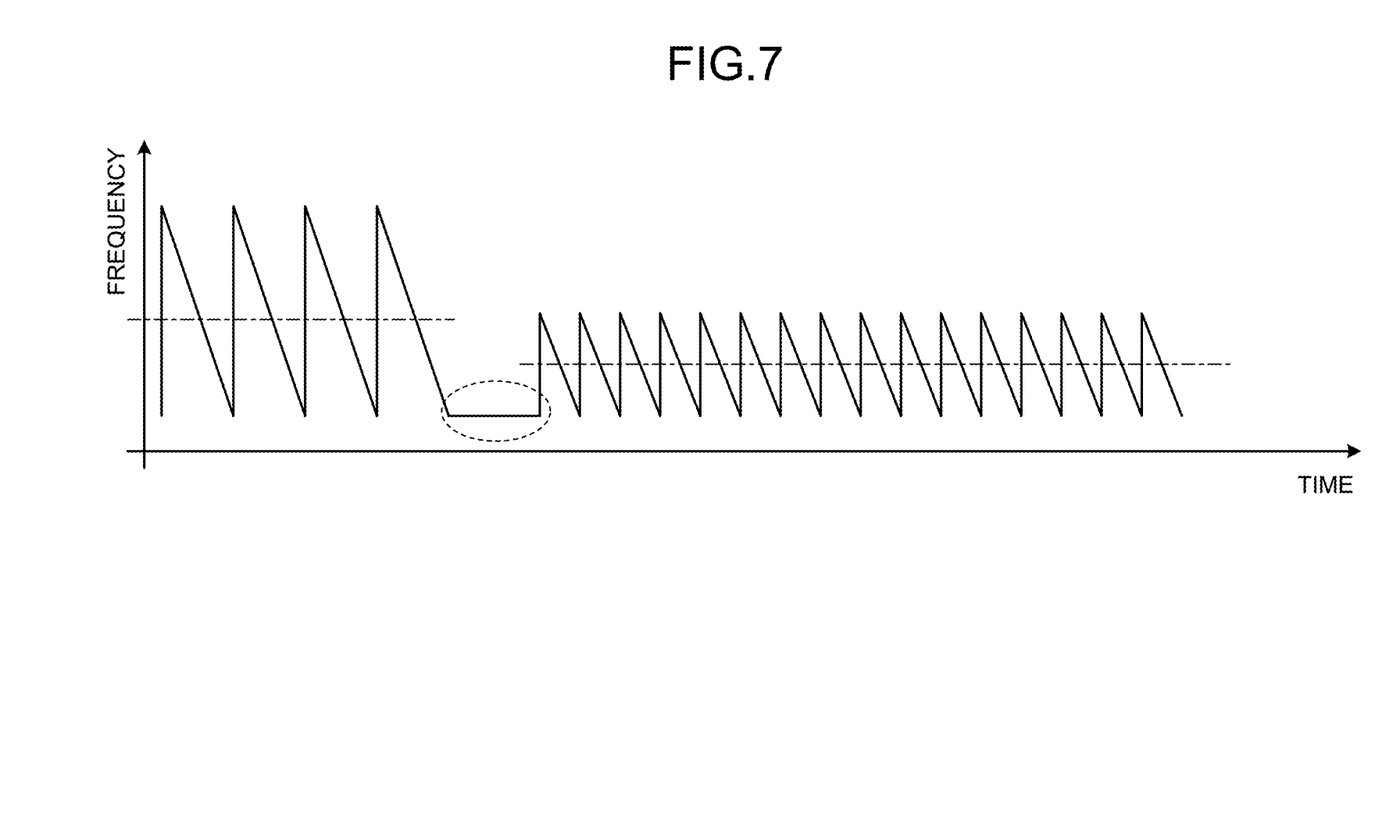
FIG. 7 is a diagram illustrating a transmission frequency used by the radar device according to the first embodiment.

FIG. 7 is a diagram illustrating a transmission frequency used by the radar device according to the first embodiment. In FIG. 7, the vertical axis represents the frequency, and the horizontal axis represents the time. FIG. 7 indicates the center frequencies of the first signal and of the second signal by dashed-and-dotted lines. The microcomputer 10 does not cause the center frequencies of the first signal and of the second signal to be equal to each other between the two different modulation schemes, but causes the initial voltage of the triangular wave voltage signal corresponding to the second modulation scheme to be equal to the initial voltage of the triangular wave voltage signal corresponding to the first modulation scheme. By causing the initial voltages to be equal to each other, the microcomputer 10 can modulate the second signal to eliminate a difference between the initial transmission frequencies of the first signal and of the second signal. The example of FIG. 4 causes the center frequencies of the first signal and of the second signal to be equal to each other, thereby causing the initial voltage of the triangular wave voltage signal corresponding to the second modulation scheme to differ from the initial voltage of the triangular wave voltage signal corresponding to the first modulation scheme, and thus causing an unnecessary phase change to occur in the beat signal at each hit in the second signal. In contrast, as illustrated in FIG. 7, the microcomputer 10 causes the initial voltage of the triangular wave voltage signal corresponding to the second modulation scheme to be equal to the initial voltage of the triangular wave voltage signal corresponding to the first modulation scheme, thereby enabling an unnecessary phase change to be eliminated in the beat signal.

Figure 8:
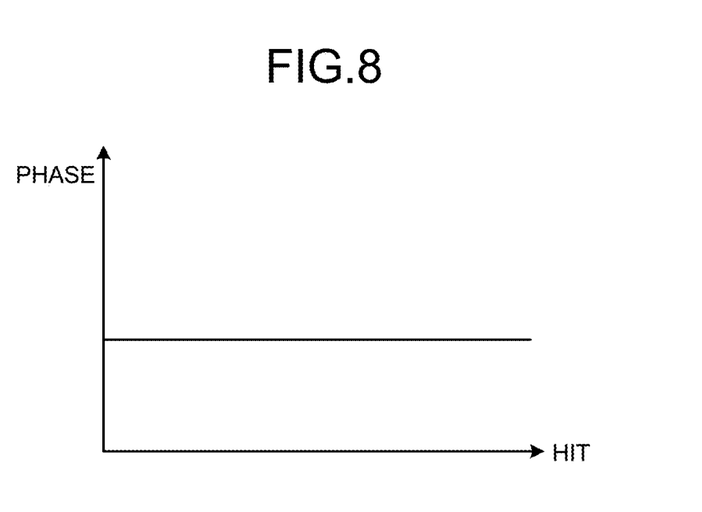
FIG. 8 is a diagram illustrating the phase of a beat signal at each hit when a stationary target object is detected using the transmission frequency of FIG. 7.

FIG. 8 is a diagram illustrating the phase of the beat signal at each hit when a stationary target object is detected using the transmission frequency of FIG. 7. In FIG. 8, the vertical axis represents the phase, and the horizontal axis represents the hit number. The phase of the beat signal is constant in FIG. 8.

Figure 9:
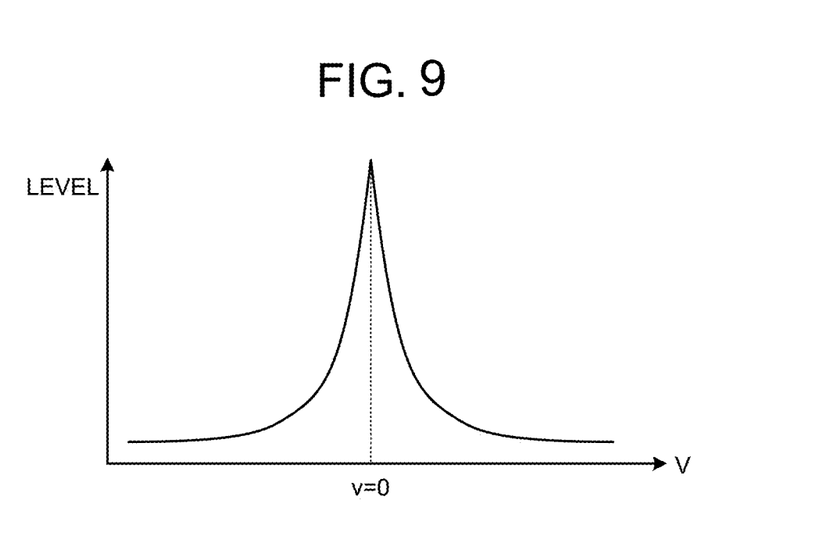
FIG. 9 is a diagram illustrating a result of performing velocity FFT when a stationary target object is detected using the transmission frequency of FIG. 7.

FIG. 9 is a diagram illustrating a result of performing velocity FFT when a stationary target object is detected using the transmission frequency of FIG. 7. In FIG. 9, the vertical axis represents the level of spectrum, and the horizontal axis represents the velocity of the target object. In FIG. 9, the result of performing velocity FFT has a peak at V=0, meaning that a result indicating that the relative velocity is zero can be obtained.

As described above, the microcomputer 10 of the present embodiment generates and updates the look-up table to cause the initial voltages of multiple signals to be equal to each other in a case in which the voltage-controlled oscillator 4 performs modulation using multiple different bandwidths within the same frame. Thus, the microcomputer 10 can eliminate an unnecessary phase change in the beat signal, and the radar device 100 can therefore reduce degradation in performance of measurement of the relative velocity with respect to the target object.

Second Embodiment

In the first embodiment, the microcomputer 10 generates and updates the look-up table to cause the initial voltages of multiple signals to be equal to each other in a case in which the voltage-controlled oscillator 4 performs modulation using multiple different bandwidths within the same frame. Meanwhile, in a second embodiment, the microcomputer 10 measures the relative velocity using phase data of the beat signal at each hit previously obtained in a stage such as pre-shipment inspection. Note that the basic configuration thereof is identical or equivalent to the configuration of the first embodiment illustrated in FIG. 1 or 2, and description of a specific configuration will therefore be omitted.

The microcomputer 10 holds phase data of the beat signal at each of multiple hits, previously obtained in a stage such as pre-shipment inspection, in a non-volatile memory. In addition, the microcomputer 10 uses the phase data being held as correction data to be used in calculation of the relative velocity. Use of such phase data by the microcomputer 10 as correction data to be used in calculation of the relative velocity enables the result of FIG. 8 to be obtained by correction of the phase value before performing the FFT using the correction data even if a phase result such as the one illustrated in FIG. 5 has been obtained. The frequency analysis result of FIG. 9 can accordingly be obtained.

Figure 10:
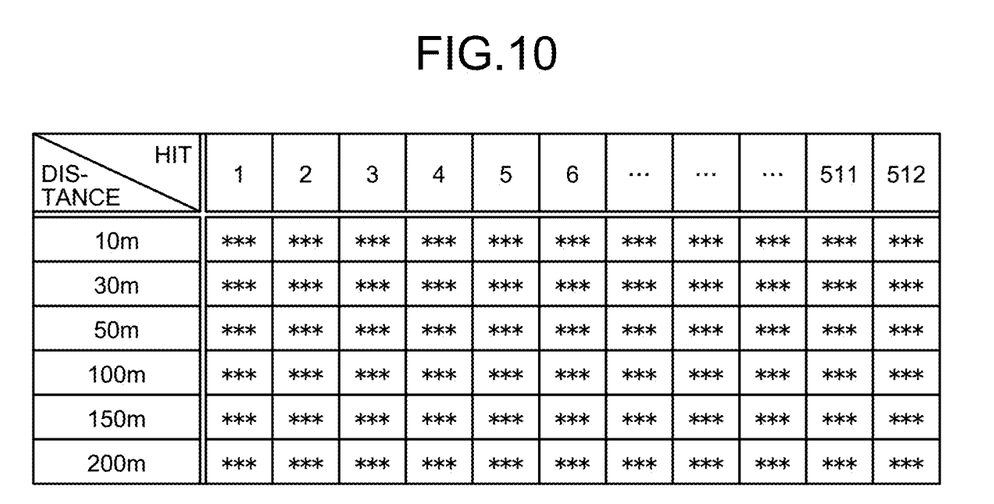
FIG. 10 is a diagram illustrating an example of correction data held by a microcomputer according to a second embodiment.

FIG. 10 is a diagram illustrating an example of correction data held by the microcomputer 10 according to the second embodiment. In FIG. 10, the correction data differs in value depending on the hit number and the distance. FIG. 10 merely illustrates one example, and the number of hits and the distance values can be changed depending on the product specification. The microcomputer 10 performs distance FFT to determine the distance, and then calculates, by linear interpolation or the like, correction data at the distance that has been determined, using correction data at distances before and after this determined distance, and corrects the phase value at each hit using the correction data. Distance FFT is an operation of calculation of the distance from the target object by FFT using the beat signal obtained at each hit.

As described above, the microcomputer 10 of the present embodiment uses, as the correction data, phase data of the beat signal at each hit previously obtained in a stage such as pre-shipment inspection. Correction of the phase value at each hit using correction data can eliminate an unnecessary phase change in the beat signal, and the radar device 100 can therefore reduce degradation in performance of measurement of the relative velocity with respect to the target object.

Third Embodiment

In the second embodiment, the microcomputer 10 holds, as the correction data, phase data of the beat signal at each hit previously obtained in a stage such as pre-shipment inspection. Meanwhile, in a third embodiment, the microcomputer 10 holds correction data for each of multiple ambient temperature values. Note that the basic configuration thereof is identical or equivalent to the configuration of the first embodiment illustrated in FIG. 1 or 2, and description of a specific configuration will therefore be omitted.

The microcomputer 10 periodically monitors the ambient temperature using the ambient temperature monitor 11 during operation of the product, and holds phase data for each surrounding temperature value. In addition, the microcomputer 10 periodically updates the applicable correction data to compensate for a deviation of the correction data caused by a temperature change.

Figure 11:
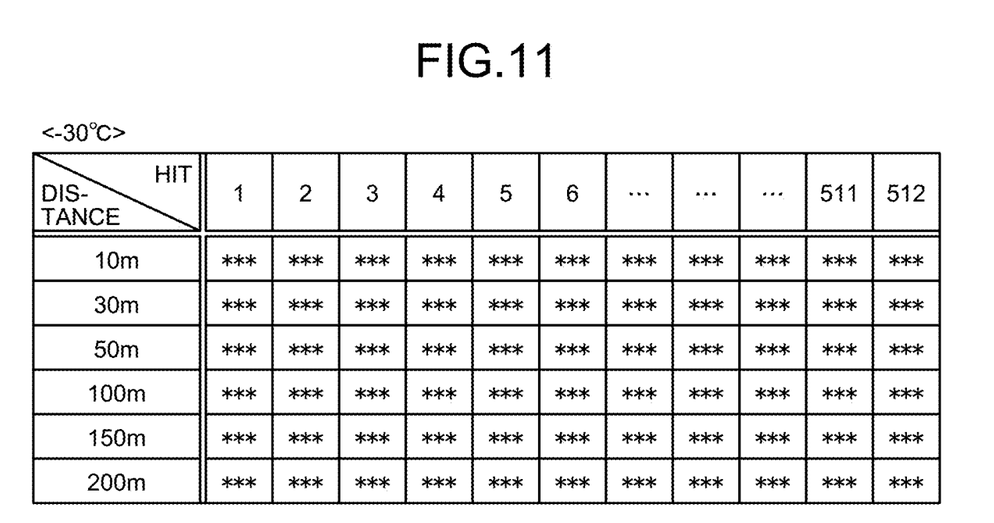
FIG. 11 is a diagram illustrating an example of correction data at an ambient temperature of −30° C. according to a third embodiment.
Figure 12:
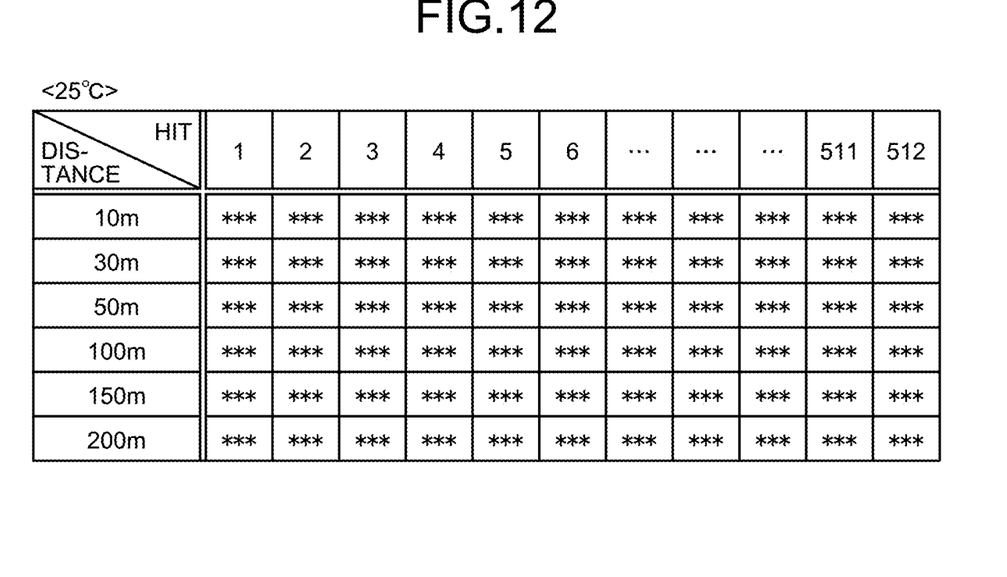
FIG. 12 is a diagram illustrating an example of correction data at an ambient temperature of 25° C. according to the third embodiment.
Figure 13:
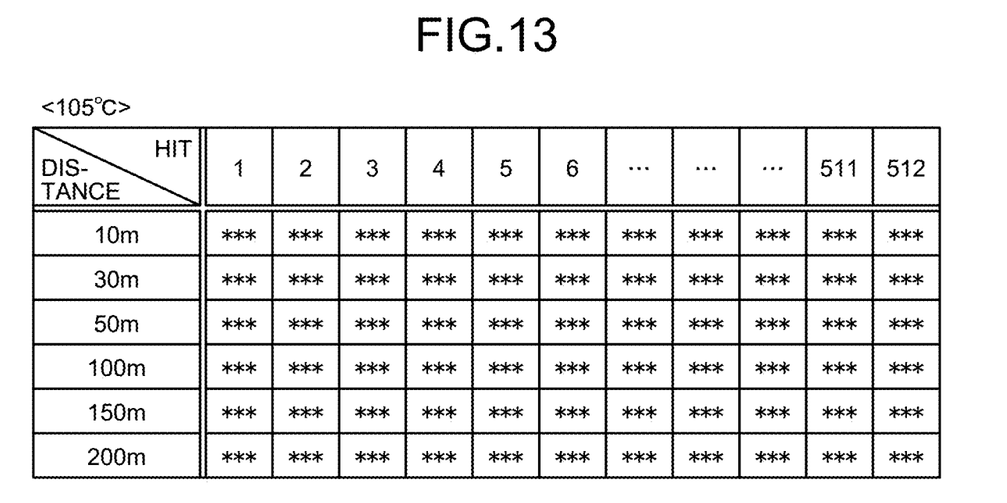
FIG. 13 is a diagram illustrating an example of correction data at an ambient temperature of 105° C. according to the third embodiment.

FIG. 11 is a diagram illustrating an example of correction data at an ambient temperature of −30° C. according to the third embodiment. FIG. 12 is a diagram illustrating an example of correction data at an ambient temperature of 25° C. according to the third embodiment. FIG. 13 is a diagram illustrating an example of correction data at an ambient temperature of 105° C. according to the third embodiment. FIGS. 11 to 13 merely illustrate one example, and the temperature, the number of hits, and the distance values for storing can be changed depending on the product specification. The microcomputer 10 monitors the ambient temperature, and then calculates, by linear interpolation or the like, a storage table for the temperature when monitoring is performed, using storage tables for temperatures before and after the monitoring, and holds, in advance, the storage table calculated. The subsequent operation is similar to the corresponding operation of the second embodiment.

As described above, the microcomputer 10 of the present embodiment uses, as the correction data, phase data of the beat signal at each hit previously obtained in a stage such as pre-shipment inspection, held for each temperature value. Correction of the phase value at each hit using correction data can eliminate an unnecessary phase change in the beat signal, and the radar device 100 can therefore reduce degradation in performance of measurement of the relative velocity with respect to the target object.

The configurations described in the foregoing embodiments are merely examples of various aspects of the present invention. These configurations may be combined with a known other technology, and moreover, a part of such configurations may be omitted and/or modified without departing from the spirit of the present invention.

REFERENCE SIGNS LIST 1 transmission antenna; 2 receiving antenna; 3 directional coupler; 4 voltage-controlled oscillator; 5, mixer; 6 baseband amplifier circuit; 7 digital-to-analog converter; 8, 16 analog-to-digital converter; 9 look-up table; 10 microcomputer; 11 ambient temperature monitor; 12 control circuit; 13 high frequency circuit; signal processing unit; 15 prescaler; 18 reference frequency generator; 100, 100a radar device; 200 control circuit; 200a processor; 200b memory.

The invention claimed is:

1. A radar device that utilizes frequency modulation of a frequency modulated continuous wave type, the radar device comprising:
a voltage-controlled oscillator to generate a high frequency signal that is frequency-modulated based on a triangular wave voltage signal;
a transmission antenna to emit the high frequency signal into air;
a receiving antenna to receive, as a reception signal, a reflected wave from a target object, of the high frequency signal;
a mixer to generate a beat signal having a frequency equal to a frequency difference between the reception signal and the high frequency signal;
an analog-to-digital converter to convert the beat signal generated by the mixer to a digital signal;
a digital-to-analog converter to convert data of a triangular wave voltage signal that is a digital signal into an analog signal, and output the analog signal to the voltage-controlled oscillator; and
a controller to calculate a distance from the target object and a relative velocity with respect to the target object, using the digital signal of the beat signal, and switch output between data of the triangular wave voltage signal corresponding to a first signal modulated in a first modulation scheme and data of the triangular wave voltage signal corresponding to a second signal modulated in a second modulation scheme within a same frame of scanning of the radar device, the first signal and the second signal using different bandwidths,
wherein the controller includes a memory to store data of the triangular wave voltage signals such that an initial voltage of data of the triangular wave voltage signal corresponding to the second modulation scheme is caused to be equal to an initial voltage of data of the triangular wave voltage signal corresponding to the first modulation scheme at a time of switching from the first modulation scheme to the second modulation scheme within the same frame to perform modulation to eliminate a difference between initial transmission frequencies of the first signal and the second signal, and
at the time of switching, the triangular wave voltage signal corresponding to the first modulation scheme and the triangular wave voltage signal corresponding to the second modulation scheme are separated by an interval of constant voltage.

2. The radar device according to claim 1, wherein the controller holds phase data of the beat signal at each hit, and uses the phase data in correction of the relative velocity.

3. The radar device according to claim 2, comprising:
an ambient temperature monitor to measure a surrounding temperature, wherein
the controller holds the phase data for each value of the surrounding temperature.

4. The radar device according to claim 1, wherein
the controller includes a look-up table to store data on the triangular wave voltage signal to be output to the voltage-controlled oscillator, and
the controller generates and updates the data on the triangular wave voltage signal stored in the look-up table to cause the initial voltage of the triangular wave voltage signal corresponding to the second modulation scheme to be equal to the initial voltage of the triangular wave voltage signal corresponding to the first modulation scheme.

5. The radar device according to claim 1, further comprising:
a prescaler to truncate a frequency of the triangular wave voltage signal to an integer value.

6. The radar device according to claim 1, wherein one frame corresponds to one scanning of the radar device.

7. The radar device according to claim 6, wherein a duration of the one scanning of the radar device is between 50 ms and 100 ms.

8. The radar device according to claim 7, wherein scanning is repeated in intervals between 50 ms and 100 ms.

9. The radar device according to claim 3, wherein the controller is configured to periodically update correction data based on the phase data for each value of the surrounding temperature.

10. The radar device according to claim 9, wherein the controller is configured to use linear interpolation to periodically update the correction data based on the phase data for each value of the surrounding temperature.

11. The radar device according to claim 10, wherein the correction data is used to correct a value of the relative velocity.

12. The radar device according to claim 1, wherein the voltage-controlled oscillator and the mixer are including in a monolithic microwave integrated circuit (MMIC).

13. The radar device according to claim 12, further comprising a directional coupler configured to divert a portion of the high frequency signal to the mixer.

14. The radar device according to claim 13, wherein the directional couple is included in the MMIC.

15. The radar device according to claim 1, wherein a center frequency corresponding to the first modulation scheme is different than a center frequency corresponding to the second modulation scheme.

* * * * *